United States Patent [19]

Shannon et al.

[11] Patent Number: 5,552,100
[45] Date of Patent: Sep. 3, 1996

[54] METHOD FOR MANUFACTURING POROUS FLUOROPOLYMER FILMS

[75] Inventors: Donald Shannon, Mission Viejo; Chris Kuo, Orange; Robert Peterson, Dove Canyon; Chris McCollam, Irvine, all of Calif.

[73] Assignee: Baxter International Inc., Deerfield, Ill.

[21] Appl. No.: 432,997

[22] Filed: May 2, 1995

[51] Int. Cl.⁶ ............................................. B29C 55/10
[52] U.S. Cl. .................. 264/127; 264/210.7; 264/288.8
[58] Field of Search .................. 264/127, 41, 210.7, 264/288.8, 154; 428/315.7, 315.5

[56] References Cited

U.S. PATENT DOCUMENTS

| | | | |
|---|---|---|---|
| 3,813,461 | 5/1974 | Murayama et al. | 264/342 R |
| 3,953,566 | 4/1976 | Gore | 264/127 |
| 3,962,153 | 6/1976 | Gore | 264/290.2 |
| 4,110,392 | 8/1978 | Yamazaki | 264/127 |
| 4,153,661 | 5/1979 | Ree et al. | 264/120 |
| 4,478,665 | 10/1984 | Hubis | 264/127 |
| 4,482,516 | 11/1984 | Bowmann et al. | 264/127 |
| 4,565,663 | 1/1986 | Errede et al. | 264/120 |
| 4,710,331 | 12/1987 | Nobuo et al. | 264/288.8 |
| 4,820,787 | 4/1989 | Kataoka et al. | 526/255 |
| 4,826,725 | 5/1989 | Harlow | 428/375 |
| 4,877,661 | 10/1989 | House et al. | 428/34.9 |
| 4,985,296 | 1/1991 | Mortimer, Jr. | 428/220 |
| 4,997,608 | 3/1991 | Haldeman et al. | 264/120 |
| 5,006,292 | 4/1991 | Shii et al. | 254/127 |
| 5,071,609 | 12/1991 | Tu et al. | 264/288.8 |
| 5,076,987 | 12/1991 | Wank et al. | 264/210.2 |
| 5,098,625 | 3/1992 | Huang et al. | 264/288.8 |
| 5,122,049 | 6/1992 | Baumgarten | 425/188 |
| 5,167,890 | 12/1992 | Sasshofer et al. | 264/127 |
| 5,207,960 | 5/1993 | Moret de Rocheprise | 264/103 |
| 5,234,739 | 8/1993 | Tanaru et al. | 428/315.5 |
| 5,234,751 | 8/1993 | Harada et al. | 428/315.7 |
| 5,288,552 | 2/1994 | Hollenbaugh, Jr. | 428/357 |

FOREIGN PATENT DOCUMENTS

| | | | |
|---|---|---|---|
| 0106496 | 4/1984 | European Pat. Off. | |
| 0113869 | 7/1984 | European Pat. Off. | 264/127 |
| 0232543 | 8/1987 | European Pat. Off. | |
| 0459907 | 12/1991 | European Pat. Off. | |
| 2049178 | 8/1974 | Germany | |
| 289881 | 5/1991 | Germany | |
| 53-0261 | 1/1978 | Japan | 264/127 |
| 54-61259 | 5/1979 | Japan | 264/127 |
| 55-108425 | 8/1980 | Japan | 264/127 |
| 57-51450 | 3/1982 | Japan | 264/127 |
| 2037294 | 7/1980 | United Kingdom | |
| WO88/04982 | 7/1988 | WIPO | |
| WO90/10673 | 9/1990 | WIPO | |

*Primary Examiner*—Jeffery R. Thurlow
*Attorney, Agent, or Firm*—Stetina Brunda Buyan; Raymond Sun

[57] ABSTRACT

A method for preparing thin fluoropolymer (PTFE) films, said method generally having the steps of: a) providing an unsintered fluoropolymer film; b) pre-sintering expansion of the film; c) sintering the expanded film with dimensional restraint to prevent shrinkage; and d) post-sintering stretching of the film to a final thickness preferably less than 0.002 inches. The post-sintering stretching of the film in step d may be accomplished in a single step, or may include a series of post-sintering stretching steps. Steps b and c of the method may be carried out bypassing the calendared film through a machine direction orienter device and, thereafter, step d of the method may be accomplished by subsequently repassing the sintered film through the machine direction orienter device, one or more additional times.

18 Claims, 2 Drawing Sheets

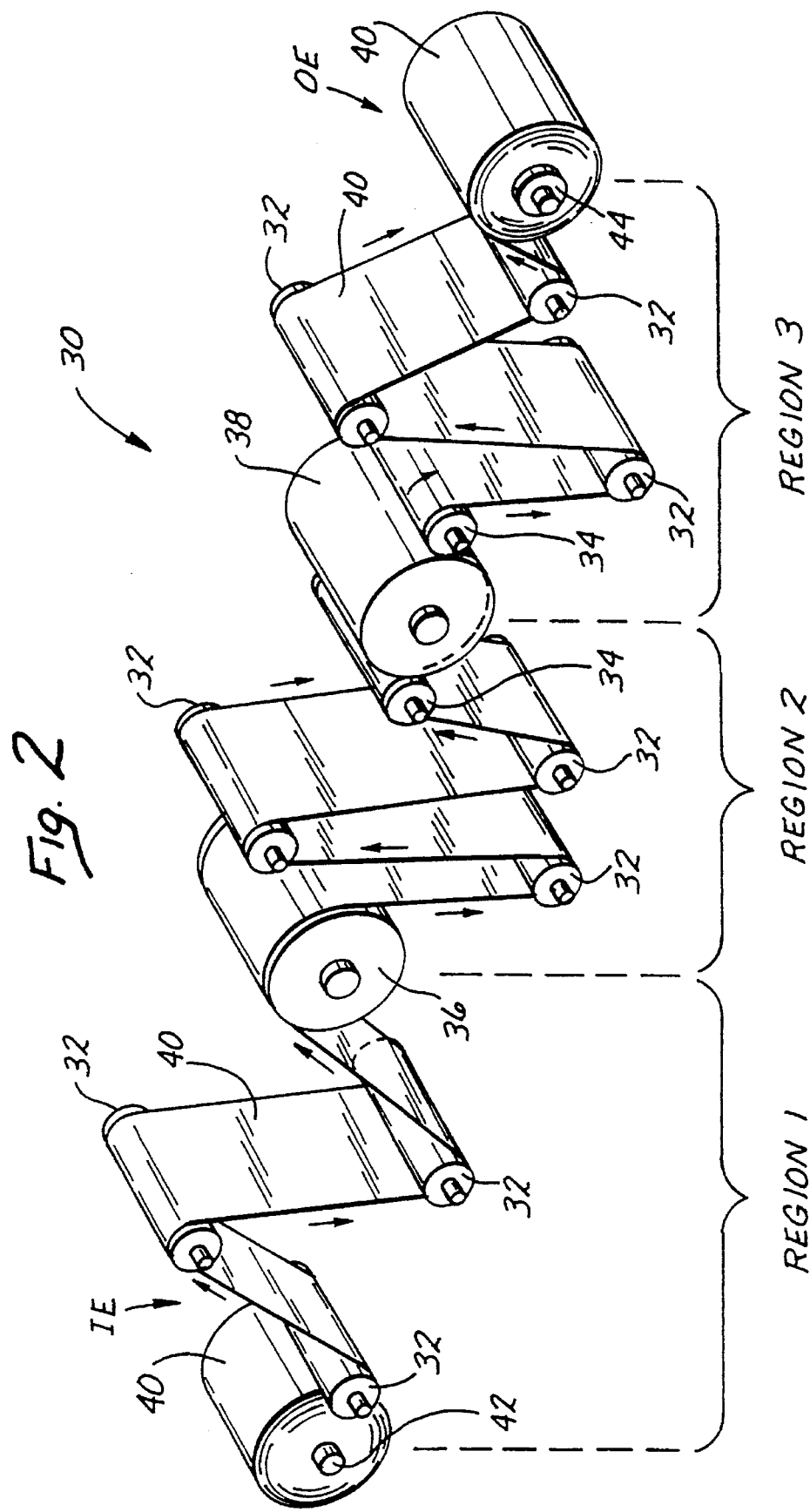

METHOD FOR MANUFACTURING POROUS FLUOROPOLYMER FILMS

FIELD OF THE INVENTION

The present invention relates to porous fluoropolymer films of the type used as membranes, tapes and the like. More particularly, the present invention relates to a method for manufacturing a porous film of polytetrofluoroethylene (hereinafter PTFE) or any other similar fluoropolymer.

BACKGROUND OF THE INVENTION

Porous fluoropolymer films have previously been used in a wide variety of applications, including vascular grafts, membrane filters, insulating tapes for electrical wires and cables, dialysis membranes, porous substrates for biological cell growth, etc. In particular, films formed of expanded, sintered PTFE have been known to exhibit superior mechanical strength properties, excellent biocompatablility and high porosity.

A. General Methods for Manufacturing Porous PTFE Films

The porous PTFE films of the prior art have typically been manufactured by a process which generally comprises the step of: a) paste extrusion, b) expansion, and c) sintering. More specifically, this typical PTFE film manufacturing process may be carried out as follows:

i) Preparation of Paste Dispersion

A quantity of PTFE powder is mixed with a liquid lubricant, such as odorless mineral spirits to form an extrudable PTFE paste.

ii) Extrusion of Film

The PTFE paste is subsequently passed through a film extrusion dye to form a wet film extrudate. The wet film extrudate is then typically wound upon a rotating core so as to form a roll of the wet film extrudate.

iii) Calendaring

The wet film extrudate is subsequently unrolled and subjected to an initial cold (i.e., <100° C.) calendaring step wherein the film is passed between at least one set of opposing stainless steel calendaring rollers having an adjustable gap thickness therebetween. The calendaring rollers are preferably maintained at a temperature between room temperature and 60° C. The width of the wet extrudate is held constant as it passes through these calendaring rollers. The thickness of the wet film extrudate is reduced to its desired final thickness (e.g., 0.004–0.005 inches) while the width of the film is maintained constant. It will be appreciated that, since the film is maintained at a constant width, the calendaring process will cause some resultant longitudinal lengthening of the film. The amount of longitudinal lengthening which results from the calendaring process is substantially determined by the amount of the diminution in the film thickness which occurs as the film passes between the calendaring rollers.

iv) Drying

Thereafter, the wet film is subjected to a drying step. This drying step may be accomplished by permitting or causing the liquid lubricant to evaporate from the matrix of the film. Such evaporation of the liquid lubricant may be facilitated by passing the film over a drum or roller which is maintained in an elevated temperature sufficient to cause the liquid lubricant to fully evaporate from the film matrix.

v) Expansion

Separately or concurrently with the drying step, the wet film is subjected to an expansion step. Such expansion step comprises drawing or expanding the PTFE film in at least one direction (e.g., longitudinally). Such expansion of the film serves to a) increase the porosity of the film, b) increase the strength of the film, and c) orient the PTFE fibrils in the direction of the access of expansion.

This expansion step is typically carried out at room temperature, without significant heating of the film during such expansion.

vi) Sintering

After the drying and expansion steps have been completed, the film is heated to a temperature above the crystalline melting point of PTFE (327° C.) but below its thermal degradation temperature (370° C.) to accomplish sintering or amorphous locking of the PTFE polymer. This sintering step may be carried out by passing the film over a drum or roller which is maintained at a high temperature (e.g., >350° C.) to cause the film to be heated to the desired sintering temperature above the melting point of the PTFE polymer, but below the thermal degradation temperature, for a sufficient period of time to effect sintering of the film.

This sintering process causes the PTFE polymer to transition from a highly crystalline state, to a more amorphous state. Thus, the sintering process is sometimes referred to as "amorphous locking" of the PTFE polymer. Such sintering or "amorphous locking" of the polymer causes the film to have significantly improved strength properties, but also typically causes the film to become harder and less stretchable.

B. Calorimetric Measurements of Unsintered and Sintered PTFE

Unsintered PTFE fine powder (having a crystallinity of about of 99%) exhibits an endothermic peak at about 347° C. (hereinafter referred to as the "initial" endothermic peak) when measured by a differential scanning calorimeter (DSC). As the PTFE undergoes sintering (i.e., when heated to a temperature above the crystalline melting point of PTFE (327° C.) but below it's thermal degradation temperature (400° C.)) the initial endothermic peak (at about 347° C.) decreases in size, and a subsequent endothermic peak appears at about 327° C. Substantially complete sintering of the PTFE may be considered to have occurred when the area under the initial endothermic peak (at about 347° C.) has decreased by at least 90%.

Accordingly, as used herein, the phrase "substantially complete sintering" of a fluoropolymer (e.g., PTFE) shall mean that the area under the initial endothermic peak of the crystalline fluoropolymer has decreased by at least 90%.

C. Typical Properties and Characteristics of Porous PTFE Films

Expanded, sintered PTFE films formed by the above-described process typically have a microstructure characterized by the presence of dense areas known as "nodes" interconnected by the elongate strands known as "fibrils".

The directional orientation of the fibrils is largely determined by the calendaring and expansion direction(s) in which the film was calendared and expanded prior to sintering thereof. Also, the diameter and spacing of the fibrils is largely determined by the dynamics (i.e., the frequency and amount) of the expansion which occurred prior to sintering of the film. The resultant porosity of the film is a function of the size of the spaces which exist between the fibrils, after the expansion and sintering steps have been completed.

The manufacturing of PTFE films having thicknesses below 0.002 have been problematic, and efforts to reach such small thickness during the pre-sintering expansion of the film have been known to result in breakage or tearing of the film. Some efforts have been made to devise methods whereby an extruded PTFE material may be post-expanded or post-treated after sintering to achieve thin films having desirable porosity characteristics.

U.S. Pat. No. 4,110,392 (Yamazaki) describes a method wherein an extruded PTFE workpiece (e.g., a film) is manufactured by a process which comprises the steps of: a) extrusion, b) stretching of the unsintered extruded workpiece, c) "free" sintering of the stretched workpiece, and d) further stretching of the sintered workpiece. The "free" sintering step of the Yamazaki process calls for workpiece to be sintered without dimensional restraint such that the workpiece is permitted to undergo natural retraction or shrinkage during the sintering process. As a result, the workpiece may shrink to a size which is almost the same as the size it had before the pre-sintering stretching or expansion process. Also, such shrinkage during sintering results in the formation of "wrinkles" on the surface of the sintered workpiece. Thus, because of the amount of retraction or shrinkage which occurs during the "free" sintering step of the process, some portion of the post-sintering stretching or expansion serves only to regain the dimensional size which was previously lost due to shrinkage of the workpiece during the "free" sintering process. Yamazaki specifically discloses processes wherein the post-sintering stretching of the workpiece is used to impart a 100%–1,000% increase in the length of the sintered workpiece.

U.S. Pat. No. 5,167,890 (Sasshofer et al.) describes a process for producing a monoaxially stretched shaped article of PTFE having a density between 1.80 and 2.30 g/cm$^3$ which process comprises a) paste extrusion of PTFE powder to form an extrudate; b) sintering the extrudate without prior expansion thereof and c) subsequently stretching the sintered article while at a temperature between 327° C. and 450° C.

U.S. Pat. No. 5,234,751 (Harada et al.) describes a method of forming porous PTFE by a) initial paste extrusion of unsintered PTFE; b) drying and calendaring of the extruded article; c) heat treating the calendared workpiece to effect partial sintering of the PTFE and c) subsequently stretching the partially sintered workpiece.

There remains a need for the development of new methods for manufacturing extremely thin (i.e.,<0.002 inches thick) fluoropolymer films which exhibit consistent strength, porosity and chemical resistance characteristics.

SUMMARY OF THE INVENTION

The present invention provides a method for manufacturing thin (i.e., <0.002 inch thick) fluoropolymer (e.g., PTFE) films which exhibit excellent strength, porosity and chemical resistance properties. The method of the present invention generally comprises the steps of: a) paste extrusion of a film extrudate, b) calendaring of the unsintered extrudate, c) expansion of the unsintered extrudate to form an expanded film, d) sintering of the fluoropolymer while restraining the film to prevent longitudinal shrinking or shortening thereof, and e) further stretching of the sintered fluoropolymer film. Step d, of the above-summarized method may be carried out in a single step, or may comprise a series of repeated stretching of the sintered PTFE fluoropolymer film. Also, step d of the method may be carried out at any suitable temperature, preferably in the range of 100° C.–326° C.

The post-sintering expansion step(s) of the process of the present invention may reduce the thickness of the film to a final thickness in the range of 0.0001–0.0009 mm, without tearing or breaking of the film. The resultant thin film exhibits excellent strength, porosity and chemical resistance properties.

BRIEF DESCRIPTION OF THE DRAWINGS

FIG. 2 is a schematic diagram of a machine direction orienter device which is usable for processing fluoropolymer films of the present invention.

DETAILED DESCRIPTION OF THE PREFERRED EMBODIMENT

Figure 1:
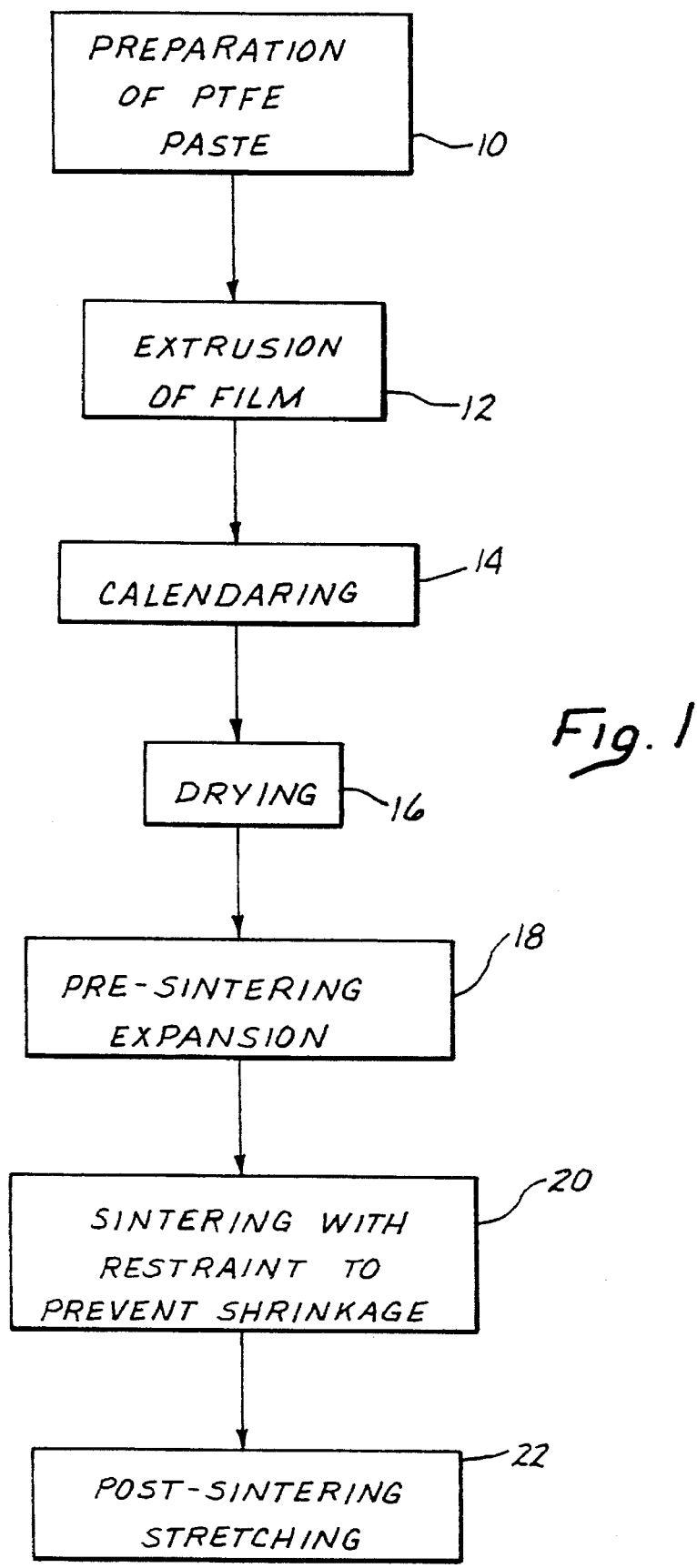
FIG. 1 is a block diagram showing the basic steps of the fluoropolymer film manufacturing process of the present invention.

The following detailed description and the accompanying drawings are provided for purposes of describing and illustrating presently preferred embodiment(s) of the invention only, and are not intended to limit the scope of the invention in any way.

i. The Method of the Present Invention

The manner in which the method of the present invention may be used to manufacture a thin PTFE film is shown in the block diagram of FIG. 1. The following are detailed description of the specific method steps illustrated in the block diagram of FIG. 1:

Step A: Preparation of PTFE Paste

The initial step of the method is the preparation of an extrudable PTFE paste 10. In this step, unsintered PTFE fine powder having a crystallinity in excess of 90% (e g., F103 or F104 Virgin PTFE Fine Powder, Dakin America, 20 Olympic Drive, Orangebury, N.Y. 10962) is blended with a quantity of liquid lubricant such as odorless mineral spirits (e.g., Isopar®, Exxon Chemical Company, Houston, Tex. 77253-3272) at a lubricant/powder weight ratio typically in the range of 25% thereby providing a PTFE paste of extrudable consistency.

Step B: Extrusion of Film

The PTFE paste dispersion prepared in step 10 is subsequently extruded 12 to form a wet film extrudate. This is typically accomplished by passing the PTFE paste dispersion through an extrusion machine at temperatures in the range of 18°–50° C. with subsequent take-up or winding of the extruded film onto a core, so as to form a roll of the wet film extrudate.

Step C: Calendaring of the Unsintered Film

The wet film extrudate is subsequently unrolled and calendared 14 by passing the unsintered film through at least one set of opposing stainless steel calendaring roller having an adjustable gap thickness therebetween. The calendaring rollers are preferably maintained at temperatures between room temperature and 60° C. The width of the unsintered film extrudate is held constant as it passes between the calendaring rollers, but the length of the unsintered film extrudate is allowed to increase as the thickness of such unsintered film extrudate becomes reduced due to compression between the calendaring rollers. Typically, this calendaring step 14 results in a decrease of the unsintered extrudate thickness to 0.004–0.005 inches. Also, following the calendaring step 14, the unsintered extrudate may have a density in the range of 1.4–1.7 g/cm$^3$.

One example of a commercially available calendaring machine usable for this purpose is the small Killion 2 roll stack (Killion Extruders, Inc., Ceder Grove, N.J. 07009).

Step D: Drying of the Unsintered Extrudate

Subsequent to the calendaring step 14, the unsintered film extrudate is subjected to a drying step 16 whereby the liquid lubricant is removed from the extrudate. This may be accomplished by passing the calendared extrudate over a heated roller or drum maintained at a temperature typically in the range of 100°–300° C., so as to cause rapid evaporation of the liquid lubricant from PTFE matrix of the film.

Step E: Pre-Sintering Expansion

Concurrently with or after the drying step 16, the unsintered film is subjected to a pre-sintering expansion step 18. In this pre-sintering expansion step 18, the unsintered film is expanded or drawn in at least one axis. This pre-sintering expansion step 18 results in: a) strength improvement, b) fibril alignment, and c) an increase in porosity of the film in accordance with previously known PTFE expansion technology. This pre-sintering expansion step 18 may be accomplished concurrently with the drying step. For example, the film may be passed over a first heated drum or roller to effect evaporation of the liquid lubricant (i.e., drying) while pulling or advancing the film off of such first drum or roller at a rate which is faster than the rate at which the film was advanced onto the first drum or roller, thereby longitudinally stretching or expanding the film as it passes over the first heated roller or drum.

After completion of this pre-sintering expansion step 18, the unsintered, expanded film may have a density of 0.9–0.01 g/cm$^3$.

Step F: Sintering With Restraint to Prevent Shrinkage

Following the pre-sintered expansion step 18, the film is subjected to a sintering step 20. In this sintering step 20, the film is restrained to prevent heat-induced shrinkage thereof while being heated to a temperature above the melting point of crystalline PTFE (e.g., above 327° C.) but below the thermal degradation temperature of PTFE (e.g., below 400° C.). Such heating and restraint of the film is maintained for a sufficient period of time to cause substantially complete sintering of the PTFE. (i.e., a decrease of at least 90% in the area under the initial endothermic peak of the unsintered PTFE as measured by DSC).

This sintering step 20 may be accomplished by passing the previously-expanded film over a heated drum or roller which is at a sufficiently high temperature to cause the film to be heated to a temperature in the range of 327°–360° C. Thereafter, the sintered film may be taken up or wound upon a roller to provide a roll of dried, sintered PTFE film. Typically, as the film cools following the sintering step 20, the film will lengthen slightly. Thus, the rate of take-up or winding upon the roller after the sintering step 20 is completed may necessarily occur at a faster rate than the feed rate of the film onto the sintering drum or roller, so as to prevent slackening or wrinkling of the dried, sintered PTFE film as it is taken up or wound upon the final roller.

After completion of this sintering step 20, the expanded, sintered film may have a density of 0.9–0.01 g/cm$^3$.

Step G: Post-Sintering Stretching

After the sintering step 20 has been completed, the dried, sintered PTFE film is subjected to one or more post-sintering stretching steps 22 wherein the dried sintered PTFE film is drawn or stretched in at least one axis. The number of post-sintering stretching steps 22 and/or the stretch ratio of each such post-sintering stretching step 22 may be adjusted to provide a final sintered PTFE film having the desired thickness. Preferably, the sintered film is heated to a temperature below 327° C. (e.g., 100°–326° C.) during this post-sintering stretching step. Also, it is preferable that each individual post-sintered stretching step 22 be carried out at an expansion ratio of less than 2.5:1, and that the number of consecutive post-sintering stretching steps be increased or decreased according to the desired result and thickness of the sintered film. For example, a film having a thickness in the range of 0.003–0.002 mm at the end of the sintering step 20 may be subjected to a series of three (3) post-sintering expansion steps 22. Each such post-sintering expansion step 22 may accomplish uniaxial longitudinal stretching of the film by a stretch ratio of 2:1, to accomplish a final film thickness in the range of 0.0003–0.0006 mm. The final film density may be in the range of 0.1–0.01 g/cm$^3$.

It will be appreciated that the above-described preferred method for manufacturing thin sintered PTFE film may be carried out using any processing devices or machinery presently available or hereafter devised.

In particular, the process of the present invention may be accomplished by repeatedly passing the previously-calendared PTFE film through a machine direction orienter or film expander device of the type previously described in U.S. Pat. Nos.: 3,962,153 (Gore), 3,953,566 (Gore), and 4,096,227 (Gore). The initial pass of the previously-calendared film through the machine direction orienter device accomplishes the drying 16, pre-sintering expansion 18 and sintering 20 steps of the method. Thereafter, the operating temperatures of the machine are adjusted and the sintered film is subsequently passed through the machine direction orienter device at least one additional time to effect the desired post-sintering expansion step 22. This specific method of carrying out the process of the present invention by repeatedly passing the previously-calendared film through the machine direction orienter device is illustrated in schematic fashion on FIG. 2.

ii. Performing Steps D–G of the Above-Described Method by Repeatedly Feeding the Film Through a Machine Direction Orienter Device FIG. 2 is a schematic showing of a machine direction orienter device 30 which is usable for carrying out the drying 16, pre-sintering expansion 18, sintering with dimensional restraint 20 and post-sintering stretching 22 steps of the method of the present invention.

With reference to FIG. 2, the device 30 comprises a series of guide rollers 32, cooling rollers 34, a single drying roller 36, and a single sintering/heating roller 38. The guide rollers 32 and/or cooling rollers 34 and/or drying roller 36 and/or sintering/heating roller 38 are connected to a motorized drive system (not shown) which is operative to drive selected ones of the rollers at differing speeds to effect the desired carriage and expansion of the film as described more fully herebelow.

The guide rollers 32 may be provided with temperature control capabilities such that the surfaces of the guide rollers 32 may be maintained at temperatures which will hold the film 40 at the desired operating temperatures as it passes through the device 30.

The drying roller 36 is provided with a temperature control system such that surface of the drying roller 36 may be heated to a temperature of 200°–300° C. so as to cause any liquid lubricant within the film 40 to evaporate from the film as the film passes over the surface of the drying roller 36.

The sintering/heating roller 38 is also provided with a temperature control system capable of maintaining the surface of the sintering/heating roller 38 at temperatures in the range of 327°–400° C. so as to cause the film 40 to be heated to a temperature above the crystalline melting point of PTFE (i.e., 327° C.) but below its thermal degradation temperature (i.e., 400° C.) as the film 40 advances over the surface of the sintering/heating roller 38.

Cooling rollers 34 positioned on either side of the sintering/heating roller 38 are typically not actively cooled, but rather are allowed to remain at ambient temperature. By allowing cooling rollers 34 to remain at ambient temperature, the temperature of the film 40 is permitted to equilibrate as is passes onto and off of the high-temperature sintering/heating roller 38.

Initially, a spool or roll 42 containing the extruded 12, calendared 14 wet unsintered film 40 is positioned at the input end of the device 30. The film is passed from the spool or roller 42 over the initial guide rollers 32, as shown. After passing over the third guide roller 32, the film 40 advances over the surface of the drying roller 36. The dry roller 36 is initially maintained at a surface temperature of 300° C. to rapidly effect the drying step 16 of the process. The rate of travel of the film 40 from the initial spool or roller 42 to the drying roller 36 is maintained at a first rate, typically in the range of 0.5–5 feet per minute.

After the film has passed over the surface of the drying roller 36, the film passes over three additional guide rollers 32, as shown, prior to passing over one of the cooling rollers 34 and onto the surface of the sintering/heating roller 38. The rate at which the film 40 moves from the surface of the drying roller to the surface of the sintering/heating roller 38 is maintained at rate 2, which is typically in the range of 5–50 feet per minute. Because rate 2 is faster than rate 1, the pre-sintering expansion step 18 is effected concurrently with the drying step 16 as the film 40 passes over the drying roller 36. The ratio of expansion effected by the pre-sintering expansion step 18 is controlled by controlling the ratio of rate 2 to rate 1. Thereafter, the dried, expanded film 40 passes over the first cooling roller 34 and onto the surface of the sintering/heating roller 38. As the film passes over the surface of the sintering/heating roller 38, the temperature of the film is raised above the crystalline melting point of PTFE (i.e., 327° C.) but below the thermal degradation temperature thereof (i.e., 400° C.). Also, while in contact with the surface of the sintering/heating roller 38, the film 40 is held taut in its longitudinal direction, thereby dimensionally restraining the film and preventing longitudinal shrinkage of the film as it passes over the sintering/heating roller 38. Thus, the passage of the film 40 over the surface of the sintering/heating roller 38 serves to effect the sintering with dimensional restraint step 20 of the process.

As the film passes off of the surface of the sintering/heating roller 38, it passes over a second cooling roller 34, and subsequently over a final series of guide roller 32. Typically, the PTFE film 40 will undergo some longitudinal lengthening as a result of the cooling process which takes place as the film passes off of the sintering/heating roller 38 and over the second cooling roller 34. Thus, the advance rate of the film 40 as is passes off of the sintering/heating roller 38 and over the second cooling roller 34 and subsequent guide rollers 32 is maintained at a third advancement rate in the range of 6–60 feet per minute. The third advancement rate is typically slightly greater than the second advancement rate so as to prevent any slackening or wrinkling of the film due to the longitudinal lengthening which occurs as the film cools following its passage over the sintering/heating roller 38.

As the dried, expanded, sintered film 40 passes out of the outlet end OE of the device 30, it is taken up on a final spool or roller 44.

Thereafter, the dried, expanded, sintered PTFE film 40 may be passed through the device 30 one or more additional times to effect the post-sintering stretching step 22 of the present invention. The temperatures of the drying roller 36 and sintering/heating roller 38 will be adjusted so as to effect lesser heating of the film 40 than occurred during the above-described first pass through the device 30. In this regard, during the second and subsequent passes of the film 40 through the device 30 the surface temperature of the drying roller 36 will preferably be maintained in the range of 200°–300° C. and the surface temperature of the sintering/heating roller 38 will preferably be maintained in the range of 300°–340° C. The temperature range of the heating/sintering roller 38 is lowered during the second and subsequent passes than it was during the first pass of the film 40 through the device 30. This lowered temperature range of the heating/sintering roller 38 serves to deter or prevent the film 40 from wrinkling or tensioning during its second and subsequent passes through the device 30. Such wrinkling or tensioning of the film 40 during its second and subsequent passes through the device 30 is of greater concern than during the first pass through the device 30 due to the decreased thickness of the film during the second and subsequent passes.

Also, during the second and subsequent passes through the device 30, the advancement rate of the film through the first, second and third regions of the device 30 will be adjusted to effect the desired post-sintering stretching step 22. To wit; the difference in advancement rate between region 1 and region 2 will be sufficient to effect the desired post-sintering stretching step 22 for that particular pass through the device 30. The difference between the advancement rate of regions 2 and 3 will be sufficient to prevent any slackening or wrinkling of the film 40 as it cools prior to contacting the sintering/heating roller 38.

The following is an example of the manner in which a previously extruded and calendared film 40 may be passed through the device 30 shown in FIG. 2, three separate times to effect a reduction in thickness of the film 40 from 0.005 inches to 0.0005 inches, without tearing or breaking of the film 40.

EXAMPLE 1

| PASS # •Roller Temperatures (°C.) | FILM ADVANCEMENT RATES Ft/Min. | | | Film Thickness at end of Pass (in.) |
|---|---|---|---|---|
| | Region 1 | Region 2 | Region 3 | |
| 1st Pass •Drying Roller = 300° C. •Sint./Heat Roller 365° C. | 3 | 21 | 24 | 0.003 in. |
| 2nd Pass •Drying Roller = 300° C. •Sint./Heat Roller 330° C. | 4 | 8 | 9 | 0.0009 in. |
| 3rd Pass •Drying Roller = 300° C. •Sint./Heat Roller 330° C. | 3 | 5 | 6 | 0.0004 in. |
| 4th Pass •Drying Roller = 300° C. •Sint./Heat Roller 330° C. | 3 | 5 | 6 | 0.0003 in. |

As can be determined from the above-set table of Example 1, the initial passage of the extruded, calendared film 40 through the device 30 results in completion of the drying steps 16, the pre-sintering expansion step 18 and the sintering step 20. The subsequent second through fourth passages of the film 40 through the device 30 effect the post-sintering stretching step 22, in three separate sub-steps, so as to further reduce the thickness of the previously sintered film 40 to 0.0003 inches. The density of the resultant film may be in the range of 0.1–0.01 g/cm$^3$.

The resultant 0.0003 inch thick film 40 exhibits excellent strength properties and high porosity to gas or liquid.

The foregoing detailed description and examples are provided for purposes of describing and illustrating presently preferred embodiments of the invention only. These detailed descriptions and examples are not intended to describe each and every possible embodiment of the invention. It is recognized that various modifications additions and alterations may be made to the above described preferred embodiments and examples without departing from the spirit and scope of the invention. Accordingly, it is intended that all such additions, modifications and alterations be included in the scope of the following claims.

What is claimed is:

1. A method for manufacturing a porous fluoropolymer film having a thickness of less than 0.002 inches, said method comprising the steps of:
   a) providing an unsintered fluoropolymer film;
   b) expanding the unsintered fluoropolymer film in at least one axis at a temperature below the crystalline melting point of the porous fluoropolymer film;
   c) sintering of the expanded fluoropolymer film while restraining the film in at least one dimension to prevent shrinkage of the film in the restrained dimension; and
   d) stretching the previously expanded and sintered fluoropolymer film in at least one axis at a temperature below the crystalline melting point of the porous fluoropolymer film to cause the thickness of the film to be reduced to less then 0.002 inch.

2. The method of claim 1 wherein step a) comprises:
preparing an extrudable fluoropolymer paste;
extruding said fluoropolymer paste to form said unsintered fluoropolymer film; and,
drying said unsintered fluoropolymer film.

3. The method of claim 2 wherein step a further comprises:
calendaring of the extruded fluoropolymer film prior to drying thereof.

4. The method of claim 3 wherein the step of "calendaring said extruded fluoropolymer film prior to drying thereof" comprises:
calendaring said extruded fluoropolymer film to a thickness of no less than 0.002 inches.

5. The method of claim 4 wherein said calendaring of said fluoropolymer film is carried out to cause said fluoropolymer film to have a thickness of 0.002–0.005 inches.

6. The method of claim 1 wherein said fluoropolymer is PTFE.

7. The method of claim 6 wherein step a comprises:
preparation of a PTFE paste by mixing a quantity of PTFE fine powder having a crystallinity in excess of 90% with a quantity of liquid lubricant to provide an extrudable PTFE paste;
extruding said paste to form an unsintered film extrudate;
calendaring the unsintered film extrudate; and,
drying the unsintered film extrudate to provide dry, unsintered, PTFE film.

8. The method of claim 2 wherein the drying step comprises heating the film to a temperature which is sufficient to cause drying but which does not exceed the crystalline melting point of the fluoropolymer.

9. The method of claim 1 wherein step b comprises:
uniaxially expanding the unsintered film by an expansion ratio in the range of 2:1–100:1.

10. The method of claim 1 wherein step c comprises:
heating the fluoropolymer film to a temperature above the crystalline melting point of the fluoropolymer without reaching the thermal degradation temperature of the fluoropolymer, and maintaining such heating for a sufficient period of time to cause substantially complete sintering of the fluoropolymer characterized by a decrease of at least 90% of the area under the initial endothermic peak of the unsintered fluoropolymer as measured by a differential scanning calorimeter.

11. The method of claim 6 wherein step c comprises:
heating the PTFE film to a temperature in excess of the crystalline melting point of PTFE but below the thermal degradation temperature of PTFE for a sufficient period of time to cause substantially complete sintering of the PTFE characterized by a decrease of at least 90% of the area under the initial endothermic peak of the unsintered PTFE as measured by a differential scanning calorimeter.

12. The method of claim 1 wherein step d comprises:
a single post-sintering stretching of the film.

13. The method of claim 1 wherein step d comprises:
a series of post-sintering stretching of the film.

14. The method of claim 1 wherein step d comprises:
stretching the film in the same axes of expansion in which the film was expanded during the pre-sintering expansion of step e.

15. The method of claim 1 wherein steps b and c of the method are carried out by passing the film through a machine direction orienter device which expands and sinters the film while applying sufficient longitudinal tension on the film to prevent longitudinal shrinkage of the film during sintering thereof.

16. The method of claim 15 wherein step d comprises subsequently passing the expanded and sintered film through a machine direction orienter device at least one time while controlling the rates at which the film advances through the machine direction orienter device so as to carry out the post-sintering stretching of step d.

17. The method of claim 16 wherein the dried, expanded and sintered film is passed through the machine direction orienter device from 1 to 5 additional times to accomplish the post-sintering stretching of step d.

18. The method of claim 16 wherein the machine direction orienter device comprises; a drying roller over which the film is passed to effect drying thereof; and, a sintering/heating roller over which the film is passed to effect sintering and heating thereof, and wherein:

during the first pass of the film through the machine direction orienter device the surface temperature of the drying roller is approximately 300° C. and the surface temperature of the sintering/heating roller is approximately 365° C.; and, during the second and subsequent passes of the film through the machine direction orienter device the surface temperature of the drying roller is approximately 300° C. and the surface temperature of the sintering/heating roller is approximately 330° C.

* * * * *